March 19, 1963  N. L. PETERSON  3,082,390
MAGNETIC CORE STRUCTURE
Filed July 9, 1959  2 Sheets-Sheet 1
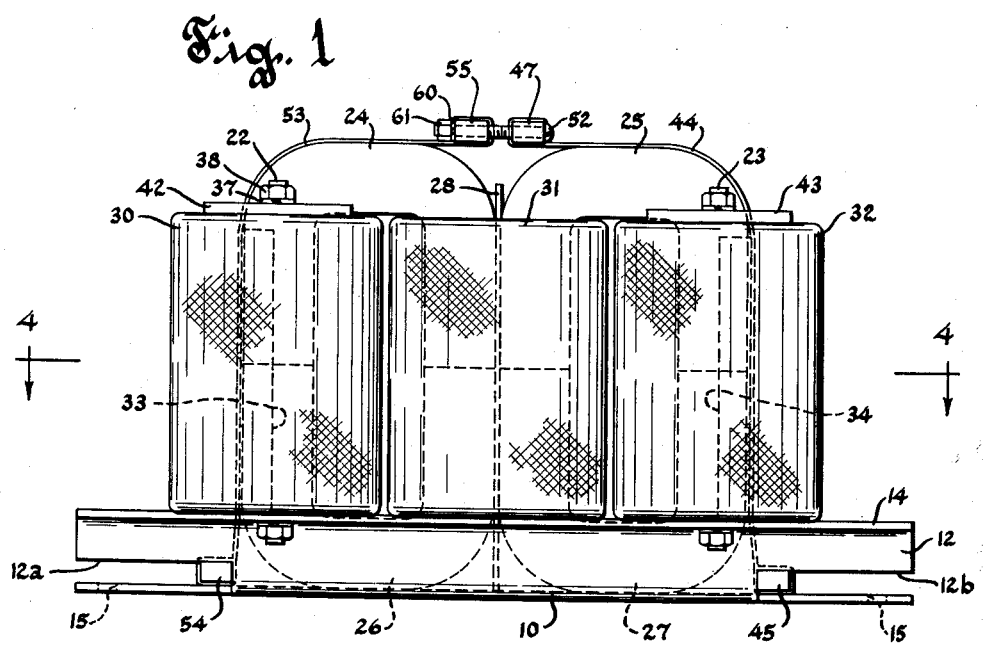
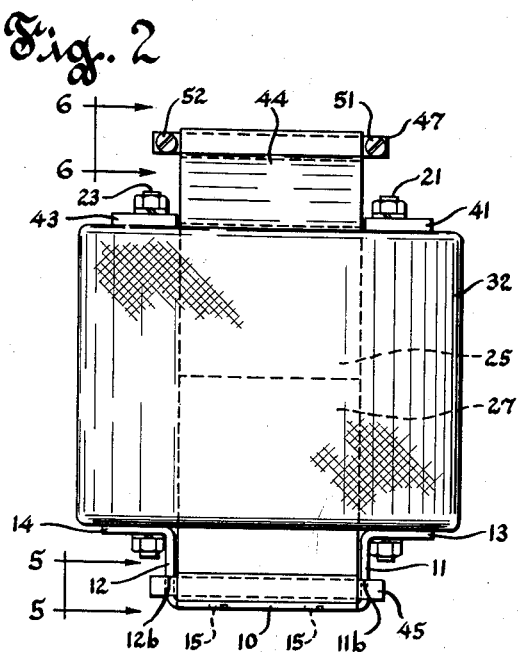
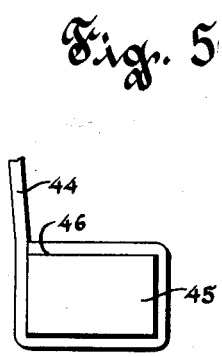
Inventor
Norman L. Peterson
By Thomas F. Kiley
Attorney March 19, 1963  N. L. PETERSON  3,082,390
MAGNETIC CORE STRUCTURE
Filed July 9, 1959  2 Sheets-Sheet 2

United States Patent Office

3,082,390
Patented Mar. 19, 1963

3,082,390
MAGNETIC CORE STRUCTURE
Norman L. Peterson, Wauwatosa, Wis., assignor to Cutler-Hammer, Inc., Milwaukee, Wis., a corporation of Delaware
Filed July 9, 1959, Ser. No. 826,074
2 Claims. (Cl. 336—210)

This invention relates generally to magnetic core structures for inductive devices such as reactors or transformers.

More particularly, it relates to means for holding together the various members of such core structures.

It is an object of this invention to provide an improved core structure for inductive devices whereby the several members which comprise the structure are assembled in tight relationship to eliminate unnecessary and undesirable air gaps in order to increase electromagnetic efficiency, to reduce vibration and noise, and to insure proper alinement of the various members.

Another object is to provide an improved core structure of the aforesaid character which is extremely sturdy from a mechanical standpoint and which is fabricated, in part, of non-magnetic materials so arranged as to have little or no electromagnetic effect on the desired magnetic characteristics of the core.

Still another object of this invention is to provide an improved core structure of the aforesaid character which is economical to manufacture and assemble.

Other and more specific objects and advantages of the invention will hereinafter appear.

The drawings illustrate a preferred embodiment of the invention, it being understood that the embodiment illustrated is susceptible to changes with respect to certain details thereof without departing from the scope of the appended claims.

In the drawings:

FIGURE 1 is a side elevational view of a reactor structure incorporating the invention;

FIG. 2 is an elevational view of the right-hand end of the structure shown in FIG. 1;

FIG. 5 is an enlarged view of a detail of the structure viewed from line 5—5 of FIG. 2.

FIGS. 1 through 4 show a magnetic reactor structure incorporating the invention. The embodiment illustrated, for example, may be assumed to have a power rating on the order of 2 k.v.a. and may be assumed to be approximately thirteen inches long, seven inches high, and six inches wide. It will be understood, however, that the invention is applicable to reactor structures or other inductive apparatus of greater or smaller size and of different configuration.

Figure 4:
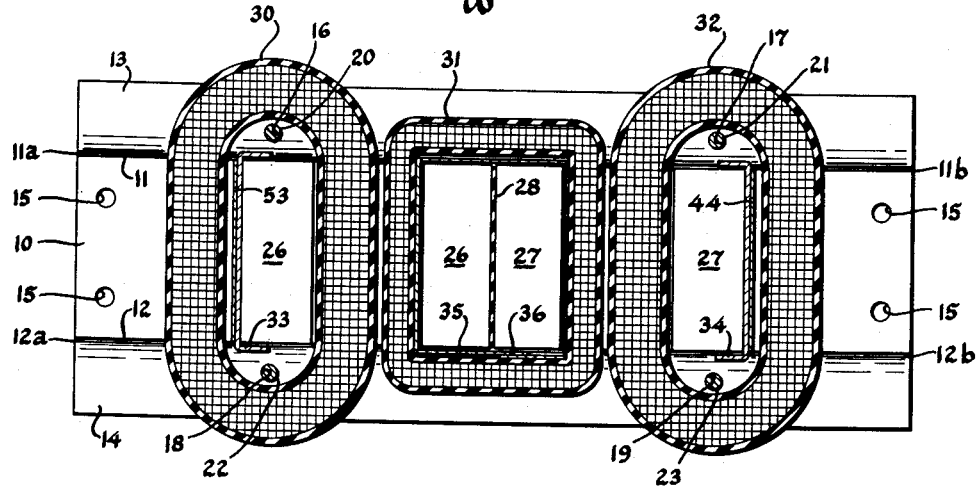
FIG. 4 is a sectional view taken along line 4—4 of FIG. 1.
Figure 6:
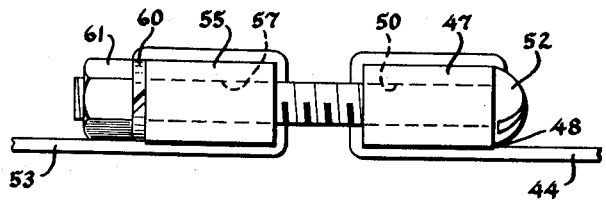
FIG. 6 is an enlarged view of another detail of the structure viewed from line 6—6 of FIG. 2.

The reactor structure comprises a rigid channel shaped mounting member or base member 10, preferably formed of steel, which has upwardly bent side walls 11 and 12 which terminate in the outwardly projecting flanges 13 and 14, respectively. The floor of the channel shaped member 10 preferably is provided with a plurality of suitable mounting holes such as those four designated by the numeral 15, which adapt the reactor structure for mounting on a floor or panel (not shown). As FIG. 4 shows, the flanges 13 and 14 of channel shaped member 10 are provided, respectively, with the holes 16, 17 and 18, 19 which accommodate the tie rods 20, 21, 22 and 23, respectively, which cooperate with metal plates, hereinafter described, to secure the coils 30 and 32 to the channel member 10, as will hereinafter appear. The side walls 11 and 12 of channel member 10 are provided at the ends thereof with the slots 11a, 12a and 11b, 12b, which anchor the strap assemblies, hereinafter described, which secure the magnetic core to the channel member.

As FIGS. 1 and 4 best show, the magnetic core assembly of the reactor comprises four U-shaped solid core members 24, 25, 26 and 27 which preferably are fabricated from suitable magnetic steel. The lower core members 26 and 27 rest side-by-side in channel member 10 with their legs projecting upward and an insulating member 28, rectangular in form, is disposed between them. The upper core members 24 and 25 are inverted and the legs thereof rest on the legs of the core members 26 and 27, respectively, being put in place thereon after the coils 30, 31 and 32 are placed around the lower core member.

Figure 3:
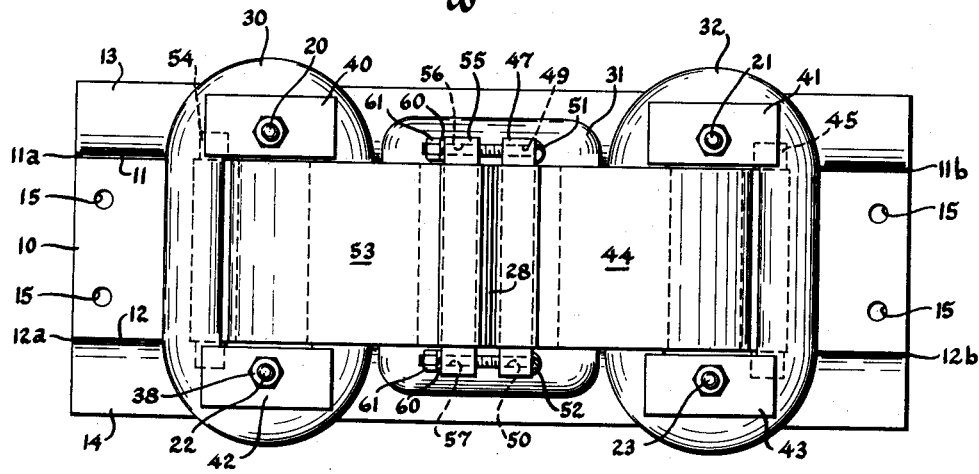
FIG. 3 is a top elevational view of the structure shown in FIG. 1.

The legs of the upper and lower core members 24, 26, 25 and 27 are held in proper alinement by two core guides 33 and 34 and by a core sleeve 35. Core guide 33, which is fabricated from a flat sheet of non-magnetic metal such as stainless steel, has bent over sides and clamps against the outer side of the left-hand end of the core, as FIGS. 1, 3 and 4 show. Core guide 34 is substantially identical to guide 33 and clamps against the outer side of the right-hand end of the core. Core sleeve 35, which is disposed around the central portion of the core, is fabricated from a flat sheet of stainless steel which is folded to form a member having a rectangular cross section, as FIG. 4 shows, and is spot-welded at position 36 where the ends of the sheet overlap. Core sleeve 35 and core guides 33 and 34 are made of stainless steel so as not to interfere with the magnetic characteristic of the core assembly.

The end coils 30 and 32 may be assumed to be the power windings of the reactor and the center coil 31 may be assumed to be the control winding. The coils 30, 31 and 32 rest on the flanges 13 and 14 of channel member 10. As FIG. 4 shows, the center coil 31 is formed so that it fits relatively snugly about the sleeve 35. The end coils 30 and 32, however, are formed so that the openings through the coils overlie the holes 16, 17 and 18, 19, respectively, in the flanges 13, and 14, respectively, in channel member 10 in order to accommodate the tie rods 20, 21 and 22, 23, respectively. Each tie rod is threaded at both ends and each end is adapted to accommodate a suitable lock washer and nut, such as washer 37 and nut 38 associated with the upper end of the rod 22, shown in FIGS. 1, 2 and 3. The end coils 30 and 32 are clamped to the channel member 10 by the tie rods 20, 22 and 21, 23, respectively, whose lower ends extend through the holes 16, 18 and 17, 19 in the flanges of channel member 10. The rods 20, 22 and 21, 23 extend through the openings in coils 30 and 32, respectively, and the upper ends of the tie rods extend through openings in the four rectangular metal plates 40, 42, 41 and 43, respectively, which lie on top of the coils 30 and 32, respectively. When the nuts on the ends of the tie rods are tightened, the coils are secured firmly between the flanges of the channel member and the plates.

Two strap assemblies are employed to mechanically secure the magnetic core assembly to the channel member 10. The right-hand strap assembly comprises a flexible sheet metal member or strap 44, which is formed of stainless steel so that it will not interfere with the magnetic characteristics of the core assembly. One end of strap 44 is folded around a steel bar 45, as FIGS. 1, 2 and 5 show, and is spot-welded thereto at the location designated by the numeral 46 in FIG. 5 is adapted to slide into the slots 11b and 12b in the side walls 11 and 12 of channel member 10 and is of rectangular cross section and of sufficient thickness so that it cannot roll in the slots when force is exerted thereon when strap 44 is drawn tight, as will hereinafter be explained. The reason for folding strap 44 around bar 45 is to distribute the stress around the bar 45 rather than solely at the weld 46 when the strap is drawn tight. As FIGS. 1, 2, 3 and 6 show, the other end of strap 45 is folded around another steel bar 47 and is welded thereto as at the location designated by the numeral 48 in FIG. 6. Bar 47 is provided with the holes 49 and 50 at either end thereof which accommodate the bolts 51 and 52.

The left-hand strap assembly, which comprises strap 53, bar 54 and bar 55, is substantially similar in construction to the right-hand strap assembly hereinbefore described and, therefore, will not be described in detail. Bar 55 is provided with holes 56 and 57 at either end thereof which accommodate the bolts 51 and 52, respectively.

The right-hand strap assembly is attached to the channel member 10 by sliding bar 45 into slots 11b and 12b. This is done before coil 32 is placed on the right-hand leg of core member 27. Coil 32 is then slid over the strap assembly and onto the core. The left-hand strap assembly and coil 30 are assembled in a similar manner. When both strap assemblies are anchored and the coils 30, 31 and 32 are in place the upper core members 24 and 25 are put in place and the strap assemblies are bent over the top of the core members 24 and 25 and the bolts 51 and 52 are inserted through the holes in bars 47 and 55 and the lock washer 60 and nuts 61 are placed on the bolts. As the nuts 61 are tightened, the straps 44 and 53 are drawn together and great force is exerted on the core members to force them together and against channel member 10.

As tension is applied to the straps 44 and 53 they are drawn against the core guides or members 34 and 33, respectively, forcing the guides sungly against the abutting core legs and causing the core members to assume proper alinement.

While the invention herein is shown embodied in a reactor structure having three coils and a core member having two end legs and a central leg, it will be apparent to those skilled in the art that it can be employed in other types of inductive structures wherein core halves must be drawn together firmly and properly alined. Thus, it could be employed, for example, in a transformer (not shown) wherein two U-shaped core members are juxtaposed in opposed relationship and have coils around the legs thereof.

The hereinbefore described structure is particularly advantageous in that standard, readily available materials are employed to fabricate the various components. Furthermore, the core members are held together with great force and in proper alinement. The structure is relatively easy to assemble and just as easily is disassembled in order to effect repair or replacement of the coils.

I claim:

1. In a core structure for electrical induction apparatus, in combination, two pairs of U-shaped magnetizable core members whose opposed legs are juxtaposed to form three core legs, a rigid channel shaped base member having a floor and flanged side walls within whose channel one pair of said U-shaped members is disposed, slots provided at the ends of the side walls of said base member, an alining member around the central core leg, another alining member disposed against the outer sides of each of the end legs of the core, a coil surrounding each core leg and its respective alining member, a flexible strap disposed between the coil and the alining member which is associated with each end leg of the core, the ends of said straps being folded around and secured to rigid bars, one of said rigid bars adapted to be anchored in the slots provided in the side walls of said base member at each end thereof, and threaded securing means which are adapted to be secured to both of the other of said rigid bars of said straps to draw said straps together to effect clamping of said core members tightly against each other and against said base member and to effect proper alinement thereof as said straps act against said alining members.

2. The combination according to claim 1, including means to clamp the end coils against the flanged portion of said base member, said means including tie rods and plates.

References Cited in the file of this patent
UNITED STATES PATENTS

| | | |
|---|---|---|
| 2,408,211 | Hodnette | Sept. 24, 1946 |
| 2,599,182 | Kerns | June 3, 1952 |
| 2,879,489 | Mitchell | Mar. 24, 1959 |
| 2,886,791 | Barengoltz | May 12, 1959 |
| 2,911,603 | Harke | Nov. 3, 1959 |